US010196268B2

(12) United States Patent
Ikejiri et al.

(10) Patent No.: US 10,196,268 B2
(45) Date of Patent: Feb. 5, 2019

(54) POSITIVE ELECTRODE ACTIVE MATERIAL FOR SODIUM ION SECONDARY BATTERIES AND METHOD FOR PRODUCING SAME

(71) Applicant: Nippon Electric Glass Co., Ltd., Shiga (JP)

(72) Inventors: Junichi Ikejiri, Shiga (JP); Hideo Yamauchi, Shiga (JP); Fumio Sato, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 75 days.

(21) Appl. No.: 15/500,990

(22) PCT Filed: Aug. 11, 2015

(86) PCT No.: PCT/JP2015/072766
§ 371 (c)(1),
(2) Date: Feb. 1, 2017

(87) PCT Pub. No.: WO2016/031561
PCT Pub. Date: Mar. 3, 2016

(65) Prior Publication Data
US 2017/0217774 A1    Aug. 3, 2017

(30) Foreign Application Priority Data

Aug. 25, 2014 (JP) .................................. 2014-170444

(51) Int. Cl.
C01B 25/45 (2006.01)
H01M 4/58 (2010.01)
H01M 10/054 (2010.01)
H01M 4/62 (2006.01)

(52) U.S. Cl.
CPC ............. *C01B 25/45* (2013.01); *H01M 4/58* (2013.01); *H01M 4/5825* (2013.01); *H01M 4/62* (2013.01); *H01M 10/054* (2013.01)

(58) Field of Classification Search
None
See application file for complete search history.

(56) References Cited

U.S. PATENT DOCUMENTS

| 2004/0206938 | A1 | 10/2004 | Barker et al. |
| 2006/0091363 | A1 | 5/2006 | Barker et al. |
| 2012/0276438 | A1* | 11/2012 | Saka ...................... C01B 25/45 429/144 |
| 2015/0010820 | A1 | 1/2015 | Takami et al. |
| 2015/0280215 | A1 | 10/2015 | Nose |
| 2015/0303470 | A1 | 10/2015 | Honma et al. |

FOREIGN PATENT DOCUMENTS

| CN | 103904317 | 7/2014 |
| JP | 2002-15735 | 1/2002 |
| JP | 2006-523930 | 10/2006 |
| JP | 2014-96261 | 5/2014 |
| JP | 2015-26483 | 2/2015 |
| JP | 2015-35420 | 2/2015 |
| WO | 2013/035572 | 3/2013 |
| WO | 2013/133369 | 7/2015 |

OTHER PUBLICATIONS

Honma, T. et al. "Fabrication of Na2FeP2O7 glass-ceramics for sodium ion battery" Journal of the Ceramic Society of Japan 120 (8) 344-346 2012. (Year: 2012).*
International Search Report dated Nov. 2, 2015 in International Application No. PCT/JP2015/072766.
Search Report dated Sep. 18, 2018 in corresponding Taiwanese Application No. 104127067, with partial English translation.
International Preliminary Report on Patentability dated Feb. 28, 2017 in International Application No. PCT/JP2015/072766.

* cited by examiner

*Primary Examiner* — Alix E Eggerding
(74) *Attorney, Agent, or Firm* — Wenderoth, Lind & Ponack, L.L.P.

(57) ABSTRACT

Provided are a positive electrode active material for a sodium ion secondary battery excellent in quick charge-discharge characteristics by preventing fusion between particles of powder during firing, and a method of producing the same. A positive electrode active material for a sodium ion secondary battery of the present invention includes inorganic powder that contains at least one kind of transition metal element selected from the group consisting of Cr, Fe, Mn, Co, and Ni, Na, P, and O, and has a BET specific surface area of from 3 $m^2/g$ to 50 $m^2/g$.

3 Claims, No Drawings

POSITIVE ELECTRODE ACTIVE MATERIAL FOR SODIUM ION SECONDARY BATTERIES AND METHOD FOR PRODUCING SAME

TECHNICAL FIELD

The present invention relates to a positive electrode active material for a sodium ion secondary battery and a method of producing the same.

BACKGROUND ART

A lithium ion secondary battery has established its position as a high-capacity and lightweight power source indispensable for, for example, a portable electronic terminal or an electric car. An active material containing an olivine-type crystal represented by the general formula $LiFePO_4$ has attracted attention as a positive electrode active material for the lithium ion secondary battery. It is known that when a particle diameter of such active material is reduced, a specific surface area involved in reactions for inserting and extracting lithium ions increases to activate the reactions, and hence battery characteristics improve (see, for example, Patent Literature 1).

However, lithium, which is used in the lithium ion secondary battery, poses a concern about a problem such as a worldwide increase in raw material cost. Accordingly, a sodium ion secondary battery using sodium as an alternative to lithium has been investigated in recent years. In Patent Literature 2, as a positive electrode active material, there is disclosed an active material containing an $Na_xM_yP_2O_7$ (where M represents at least one or more kinds of transition metal elements selected from Cr, Fe, Mn, Co, and Ni, x falls within a range of $1.20 \leq x \leq 2.10$, and y falls within a range of $0.95 \leq y \leq 1.60$) crystal.

CITATION LIST

Patent Literature 1: JP 2002-15735 A
Patent Literature 2: WO 2013/133369 A1

SUMMARY OF INVENTION

Technical Problem

In the positive electrode active material for a sodium ion secondary battery disclosed in Patent Literature 2, when an attempt is made to reduce the particle diameter of the positive electrode active material and increase its specific surface area in order to improve battery characteristics, such as quick charge-discharge characteristics, fusion between its particles occurs during firing, resulting in the formation of coarse particles. As a result, there has been a problem in that the specific surface area of the positive electrode active material to be obtained does not increase and the battery characteristics do not improve as expected.

It is an object of the present invention to provide a positive electrode active material for a sodium ion secondary battery excellent in quick charge-discharge characteristics by preventing fusion between particles of powder during firing, and a method of producing the same.

Solution to Problem

According to one embodiment of the present invention, there is provided a positive electrode active material for a sodium ion secondary battery, comprising inorganic powder that contains at least one kind of transition metal element selected from the group consisting of Cr, Fe, Mn, Co, and Ni, Na, P, and O, the positive electrode active material having a BET specific surface area of from 3 $m^2/g$ to 50 $m^2/g$.

It is preferred that the positive electrode active material for a sodium ion secondary battery according to the embodiment of the present invention contain a crystal represented by a general formula $Na_xM_yP_2O_7$, where M represents at least one kind of transition metal element selected from the group consisting of Cr, Fe, Mn, Co, and Ni, x falls within a range of $1.20 \leq x \leq 2.10$, and y falls within a range of $0.95 \leq y \leq 1.60$.

It is preferred that the positive electrode active material for a sodium ion secondary battery according to the embodiment of the present invention contain, in terms of mol %, 25% to 55% of $Na_2O$, 10% to 30% of $Cr_2O_3+Fe_2O_3+MnO_2+CoO+NiO$, and 25% to 55% of $P_2O_5$.

According to one embodiment of the present invention, there is provided a method of producing a positive electrode active material for a sodium ion secondary battery comprising inorganic powder that contains at least one kind of transition metal element selected from the group consisting of Cr, Fe, Mn, Co, and Ni, Na, P, and O, the method comprising:

(a) an amorphous material formation step of melting a raw material that contains at least one kind of transition metal element selected from the group consisting of Cr, Fe, Mn, Co, and Ni, Na, P, and O, to thereby obtain an amorphous material;

(b) a crystallized material formation step of subjecting the amorphous material to heat treatment to obtain a crystallized material;

(c) a pulverization step of pulverizing the crystallized material to obtain crystallized material powder having a BET specific surface area of from 3 $m^2/g$ to 50 $m^2/g$; and (d) a firing step of subjecting the crystallized material powder to heat treatment to precipitate a crystal represented by a general formula $Na_xM_yP_2O_7$.

Advantageous Effects of Invention

According to the present invention, the positive electrode active material for a sodium ion secondary battery excellent in quick charge-discharge characteristics can be obtained by preventing fusion between particles of powder during firing.

DESCRIPTION OF EMBODIMENTS

A positive electrode active material for a sodium ion secondary battery of the present invention comprises inorganic powder that contains at least one kind of transition metal element selected from the group consisting of Cr, Fe, Mn, Co, and Ni, Na, P, and O, and has a BET specific surface area of from 3 $m^2/g$ to 50 $m^2/g$.

Na serves as a supply source of sodium ions that move between a positive electrode active material and a negative electrode active material during the charge and discharge of a battery. The at least one kind of transition metal element selected from the group consisting of Cr, Fe, Mn, Co, and Ni acts as a driving force for extracting sodium ions from the positive electrode active material and inserting sodium ions in the positive electrode active material through a change in valence of an ion of the transition metal element during the charge and discharge of the battery. P and O have an effect of stabilizing the crystal structure of the positive electrode active material through the formation of a $PO_4$ tetrahedron unit.

The BET specific surface area is from 3 $m^2$/g to 50 $m^2$/g, preferably from 5 $m^2$/g to 40 $m^2$/g, more preferably from 6 $m^2$/g to 30 $m^2$/g. When the BET specific surface area is excessively small, there is a tendency that it is difficult to insert and extract sodium ions and internal resistance increases. As a result, a discharge capacity lowers during quick discharging. Meanwhile, when the BET specific surface area of the positive electrode active material is excessively large, a large amount of a dispersion medium is required for forming the positive electrode active material into a paste, and as a result, an electrode density tends to decrease to lower the discharge capacity per unit volume of the electrode. In addition, a metal component of the inorganic powder is eluted into an electrolyte, resulting in a problem such as a decrease in life of the battery. The BET specific surface area was measured by a BET single-point method using nitrogen as an adsorbate.

The average particle diameter of the positive electrode active material is preferably from 0.1 μm to 4 μm, more preferably from 0.2 μm to 2 μm, still more preferably from 0.3 μm to 1 μm, particularly preferably from 0.4 μm to 0.8 μm. When the average particle diameter of the positive electrode active material is excessively small, an aggregation force between positive electrode active material particles increases, and hence the positive electrode active material particles are difficult to disperse when formed into a paste. As a result, the internal resistance of the battery increases and its discharge voltage is liable to lower. In addition, the electrode density tends to decrease to lower the discharge capacity per unit volume of the battery. Meanwhile, when the average particle diameter of the positive electrode active material is excessively large, the BET specific surface area of the positive electrode active material is liable to decrease, sodium ions do not diffuse easily, and the internal resistance tends to increase. In addition, the surface smoothness of the electrode tends to be poor.

In the present invention, the average particle diameter means D50 (volume-based average particle diameter), and refers to a value measured by a laser diffraction scattering method.

It is preferred that the positive electrode active material for a sodium ion secondary battery of the present invention contain a crystal represented by the general formula $Na_xM_yP_2O_7$, where M represents at least one kind of transition metal element selected from the group consisting of Cr, Fe, Mn, Co, and Ni, x falls within a range of 1.20≤x≤2.10, and y falls within a range of 0.95≤y≤1.60. With the above-mentioned configuration, as the positive electrode active material for a sodium ion secondary battery, there can be obtained a positive electrode active material for a sodium ion secondary battery having a high theoretical capacity (about 97 mAh/g), a high discharge voltage (about 3 V), and a satisfactory cycle characteristic. In particular, the crystal represented by the general formula $Na_xM_yP_2O_7$ is preferably a crystal represented by the general formula $Na_x(Fe_{1-z}M'_z)_yP_2O_7$ (where M' represents at least one kind of transition metal element selected from the group consisting of Cr, Mn, Co, and Ni, x falls within a range of 1.20≤x≤2.10, y falls within a range of 0.95≤y≤1.60, and z falls within a range of 0≤y<1) because the cycle characteristic becomes more satisfactory.

It is preferred that the positive electrode active material for a sodium ion secondary battery of the present invention comprise an amorphous phase. When the positive electrode active material for a sodium ion secondary battery comprises an amorphous phase, the sodium ion conductivity of the positive electrode active material improves, and hence the high speed charge-discharge characteristics improve easily.

Further, it is preferred that the positive electrode active material for a sodium ion secondary battery of the present invention be formed of crystallized glass. When the positive electrode active material for a sodium ion secondary battery is formed of crystallized glass, the $Na_xM_yP_2O_7$ crystal and the amorphous phase can easily form a composite, and hence both the discharge capacity and high speed charge-discharge characteristics of the positive electrode active material tend to improve.

The crystallinity of the $Na_xM_yP_2O_7$ crystal in the positive electrode active material is preferably 70 mass % or more, more preferably 80 mass % or more, particularly preferably 90 mass % or more. When the crystallinity of the $Na_xM_yP_2O_7$ crystal is excessively low, the discharge capacity tends to lower. Its upper limit is not particularly limited, but the crystallinity is practically 99 mass % or less.

The crystallinity of the $Na_xM_yP_2O_7$ crystal is determined by carrying out peak separation to each crystalline diffraction line and an amorphous halo in a diffraction line profile ranging from 10° to 60° in terms of a 2θ value obtained by powder X-ray diffraction measurement using CuKα rays. Specifically, when an integral intensity obtained by carrying out the peak separation of a broad diffraction line (amorphous halo) in the range of from 10° to 45° from a total scattering curve obtained by performing background subtraction from the diffraction line profile is defined as Ia, the total sum of integral intensities obtained by carrying out the peak separation of each crystalline diffraction line derived from the $Na_xM_yP_2O_7$ crystal detected in the range of from 10° to 60° from the total scattering curve is defined as Ic, and the total sum of integral intensities obtained from other crystalline diffraction lines is defined as Io, the content Xc of the crystal is determined on the basis of the following equation.

$$Xc=[Ic/(Ic+Ia+Io)]\times100(\%)$$

As the crystallite size of the $Na_xM_yP_2O_7$ crystal becomes smaller, the average particle diameter of the positive electrode active material particles can be reduced more, and electric conductivity can be improved more. Specifically, the crystallite size of the $Na_xM_yP_2O_7$ crystal is preferably 100 nm or less, particularly preferably 80 nm or less. Its lower limit is not particularly limited, but the crystallite size is practically 1 nm or more, further 10 nm or more. The crystallite size is determined in accordance with the Scherrer equation on the basis of the analysis results of powder X-ray diffraction.

It is preferred that the positive electrode active material for a sodium ion secondary battery of the present invention contain, in terms of mol %, 25% to 55% of $Na_2O$, 10% to 30% of $Cr_2O_3+Fe_2O_3+MnO_2+CoO+NiO$, and 25% to 55% of $P_2O_3$. The reasons why the composition is limited as described above are described below.

$Na_2O$ is a main component of the $Na_xM_yP_2O_7$ crystal. The content of $Na_2O$ is preferably from 25% to 55%, more preferably from 30% to 50%. When the content of $Na_2O$ is excessively small or excessively large, the $Na_xM_yP_2O_7$ crystal is hardly precipitated.

At least one kind selected from the group consisting of $Cr_2O_3$, $Fe_2O_3$, $MnO_2$, CoO, and NiO is also a main component of the $Na_xM_yP_2O_7$ crystal. The content of the at least one kind selected from the group consisting of $Cr_2O_3$, $Fe_2O_3$, $MnO_2$, CoO, and NiO is preferably from 10% to 30%, more preferably from 15% to 25%. When the content of the at least one kind selected from the group consisting of $Cr_2O_3$, $Fe_2O_3$, $MnO_2$, CoO, and NiO is excessively small, the $Na_xM_yP_2O_7$ crystal is hardly precipitated. Meanwhile, when the content of the at least one kind selected from the group consisting of $Cr_2O_3$, $Fe_2O_3$, $MnO_2$, CoO, and NiO is excessively large, the $Na_xM_yP_2O_7$ crystal is hardly precipitated, and at the same time, undesired crystals of $Cr_2O_3$, $Fe_2O_3$, $MnO_2$, CoO, NiO, and the like are liable to precipitate. In particular, in order to improve the cycle characteristic and quick charge-discharge characteristics, the at least one kind selected from the group consisting of $Cr_2O_3$, $Fe_2O_3$, $MnO_2$, CoO, and NiO is preferably $Fe_2O_3$.

$P_2O_5$ is also a main component of the $Na_xM_yP_2O_7$ crystal. The content of $P_2O_5$ is preferably from 25% to 55%, more preferably from 30% to 50%. When the content of $P_2O_5$ is excessively small or excessively large, the $Na_xM_yP_2O_7$ crystal is hardly precipitated. In addition, the positive electrode active material for a sodium ion secondary battery of the present invention may contain $Nb_2O_5$, MgO, $Al_2O_3$, $TiO_2$, $ZrO_2$, or $Sc_2O_3$. When the positive electrode active material contains any such component, the component is incorporated into the $Na_xM_yP_2O_7$ crystal to facilitate the generation of an $Na_xM_yP_2O_7$ crystal having higher electron conductivity, and hence the high speed charge-discharge characteristics improve easily. The total content of the above-mentioned components is preferably from 0% to 25%, particularly preferably from 0.2% to 10%. When the content of the above-mentioned components is excessively large, crystals of different kinds are liable to be generated to lower the crystallinity of the $Na_xM_yP_2O_7$ crystal, and hence the discharge capacity is liable to lower.

In addition to the above-mentioned components, the positive electrode active material may also contain, for example, $SiO_2$, $B_2O_3$, $GeO_2$, $Ga_2O_3$, $Sb_2O_3$, or $Bi_2O_3$. When the positive electrode active material further contains any such component, glass formability improves, and a homogeneous amorphous material is easily obtained. The total content of the above-mentioned components is preferably from 0% to 25%, particularly preferably from 0.2% to 10%. When the content of the above-mentioned components is excessively large, the crystallinity of the $Na_xM_yP_2O_7$ crystal is liable to lower.

Further, it is preferred that the positive electrode active material for a sodium ion secondary battery of the present invention be in a form of particles, the particles each having a surface covered with conductive carbon. When the particles each have a surface covered with the conductive carbon, the electron conductivity increases, and the high speed charge-discharge characteristics improve easily.

The content of the carbon is, in terms of mass %, preferably from 0.01% to 10%, more preferably from 0.03% to 7%, still more preferably from 0.05% to 5%, particularly preferably from 0.07 mass % to 4 mass %. When the content of the carbon is excessively small, coverage by a carbon-containing layer becomes insufficient, and the electron conductivity tends to be poor. Meanwhile, when the content of the carbon is excessively large, the content of the positive electrode active material particles relatively decreases, and hence the discharge capacity tends to decrease.

In the positive electrode active material for a sodium ion secondary battery of the present invention, it is preferred that, in Raman spectroscopy, a ratio (D/G) of a peak intensity D at from 1,300 $cm^{-1}$ to 1,400 $cm^{-1}$ with respect to a peak intensity G at from 1,550 $cm^{-1}$ to 1,650 $cm^{-1}$ be 1 or less, in particular, 0.8 or less, and a ratio (F/G) of a peak intensity F at from 800 $cm^{-1}$ to 1,100 $cm^{-1}$ with respect to the peak intensity G be 0.5 or less, in particular, 0.1 or less. When those peak intensity ratios satisfy the above-mentioned ranges, the electron conductivity of the positive electrode active material tends to increase.

The positive electrode active material for a sodium ion secondary battery of the present invention has a tap density of preferably 0.3 g/ml or more, particularly preferably 0.5 g/ml or more. When the tap density is excessively small, the electrode density decreases, and the discharge capacity per unit volume of the battery tends to lower. The upper limit takes a value roughly equivalent to a true specific gravity. However, in consideration of the agglomeration of the powder, the tap density is practically 5 g/ml or less, in particular, 4 g/ml or less. In the present invention, the tap density refers to a value measured under the tapping conditions of a tapping stroke of 10 mm, a number of times of tapping of 250, and a tapping speed of 2 times/1 second.

The positive electrode active material of the present invention can be used for a sodium ion secondary battery using an electrolytic solution, such as an aqueous solvent, a nonaqueous solvent, or an ion liquid. In addition, the positive electrode active material of the present invention can also be used for an all-solid sodium ion secondary battery using a solid electrolyte. A method of producing a positive electrode active material for a sodium ion secondary battery of the present invention is a method of producing a positive electrode active material for a sodium ion secondary battery comprising inorganic powder that contains at least one kind of transition metal element selected from the group consisting of Cr, Fe, Mn, Co, and Ni, Na, P, and O, the method comprising: (a) an amorphous material formation step of melting a raw material that contains at least one kind of transition metal element selected from the group consisting of Cr, Fe, Mn, Co, and Ni, Na, P, and O, to thereby obtain an amorphous material; (b) a crystallized material formation step of subjecting the amorphous material to heat treatment to obtain a crystallized material; (c) a pulverization step of pulverizing the crystallized material to obtain crystallized material powder having a BET specific surface area of from 3 $m^2$/g to 50 $m^2$/g; and (d) a firing step of subjecting the crystallized material powder to heat treatment to precipitate a crystal represented by the general formula $Na_xM_yP_2O_7$. When the above-mentioned production method is adopted, a positive electrode active material for a sodium ion secondary battery excellent in quick charge-discharge characteristics can be obtained by preventing fusion between particles of the powder in the firing step.

In the amorphous material formation step of melting a raw material that contains at least one kind of transition metal element selected from the group consisting of Cr, Fe, Mn, Co, and Ni, Na, P, and O, to thereby obtain an amorphous material, the melting temperature may be appropriately adjusted so that the raw material powder is homogeneously melted. Specifically, the melting temperature is preferably 800° C. or more, more preferably 900° C. or more. Its upper limit is not particularly limited, but an excessively high melting temperature leads to an energy loss and the evaporation of sodium, and hence the melting temperature is preferably 1,500° C. or less, more preferably 1,400° C. or less.

A method for the forming of the amorphous material is not particularly limited. For example, the amorphous material may be poured between a pair of cooling rolls and formed into a film shape while rapidly cooled, or the amorphous material may be poured out into a mold and formed into an ingot shape.

In the crystallized material formation step of subjecting the obtained amorphous material to heat treatment to obtain a crystallized material, the heat treatment is performed, for example, in an electric furnace capable of temperature control. When the crystallized material formation step is not performed, particles of the crystallized material powder fuse with each other in the firing step to be described later, and hence the BET specific surface area of the positive electrode active material to be obtained lowers. Accordingly, a positive electrode active material powder having a BET specific surface area of 3 $m^2/g$ or more becomes difficult to produce, and the battery characteristics of the positive electrode active material to be obtained lower.

The heat treatment temperature in the crystallized material formation step is preferably equal to or higher than a glass transition temperature, more preferably equal to or higher than a crystallization temperature. Specifically, the heat treatment temperature is preferably 350° C. or more, more preferably 400° C. or more. When the heat treatment temperature is excessively low, the precipitation of the $Na_xM_yP_2O_7$ crystal may become insufficient in the firing step to be described later.

The heat treatment time is appropriately adjusted so that the crystallization of the amorphous material proceeds sufficiently. Specifically, the heat treatment time is preferably from 20 minutes to 300 minutes, more preferably from 30 minutes to 240 minutes.

The obtained crystallized material only needs to have the crystal precipitated therein at a high ratio, and may be crystallized glass comprising an amorphous phase.

In the pulverization step of pulverizing the obtained crystallized material to obtain crystallized material powder having a BET specific surface area of from 3 $m^2/g$ to 50 $m^2/g$, a pulverization method is not particularly limited, and a general pulverizer, such as a ball mill or a bead mill, may be used.

The BET specific surface area of the crystallized material powder is from 3 $m^2/g$ to 50 $m^2/g$, preferably from 5 $m^2/g$ to 40 $m^2/g$, more preferably from 6 $m^2/g$ to 30 $m^2/g$. In the case where the BET specific surface area of the crystallized material powder is excessively small, when the positive electrode active material is obtained therefrom through the firing step to be described later, the BET specific surface area of the positive electrode active material decreases. Accordingly, there is a tendency that sodium ions do not diffuse easily and the internal resistance increases. As a result, during quick discharge, the discharge capacity lowers. Meanwhile, in the case where the BET specific surface area of the crystallized material powder is excessively large, when the positive electrode active material is obtained therefrom through the step to be described later, a large amount of a dispersion medium is required to form the crystallized material powder into a paste, and as a result, the electrode density tends to decrease to lower the discharge capacity per unit volume of the electrode. In addition, a metal component of the inorganic powder is eluted into the electrolyte, resulting in a problem such as a decrease in life of the battery.

In the firing step of subjecting the obtained crystallized material powder to heat treatment to precipitate a crystal represented by the general formula $Na_xM_yP_2O_7$, when M comprises Fe, the iron in the crystallized material powder is reduced through firing to precipitate the $Na_xM_yP_2O_7$ crystal. When the firing is performed in an inert atmosphere, such as argon or nitrogen, the firing is preferably performed after the surface of the crystallized material powder is covered with an organic compound in advance. The covering organic compound serves as a reducing agent, and reduces the iron in the crystallized material powder. The firing may be performed in an atmosphere containing a reducing gas, such as hydrogen, to reduce the iron in the crystallized material powder. The reducing gas may be contained in an inert gas, such as nitrogen, and the content of the reducing gas in that case is preferably 4.0 vol % or more.

The firing temperature is preferably 350° C. or more, more preferably 400° C. or more. When the firing temperature is excessively low, the precipitation of the crystal becomes insufficient, and there is a risk in that the discharge capacity may lower. Meanwhile, the upper limit of the firing temperature is preferably 800° C., more preferably 750° C. When the firing temperature is excessively high, crystals of different kinds are liable to precipitate, and there is a risk in that the discharge capacity may lower.

The firing time is appropriately adjusted so that the precipitation of the crystal proceeds sufficiently. Specifically, the firing time is preferably from 20 minutes to 300 minutes, more preferably from 30 minutes to 240 minutes.

EXAMPLES

Now, the present invention is described in detail by way of Examples. The present invention is by no means limited to the following Examples. The following Examples are merely illustrative.

Example 1

(a) Amorphous Material Formation Step

Sodium metaphosphate ($NaPO_3$) and ferric oxide ($Fe_2O_3$) were used as raw materials to prepare raw material powder having a composition comprising, in terms of mol %, 40% of $Na_2O$, 20% of $Fe_2O_3$, and 40% of $P_2O_3$. The raw material powder was melted at 1,200° C. for 45 minutes in the atmosphere. After that, the resultant was poured into a carbon jig, and subjected to ingot forming to provide an amorphous material.

(b) Crystallized Material Formation Step

The obtained amorphous material was subjected to heat treatment in the atmosphere at 620° C. for 3 hours to provide a crystallized material.

(c) Pulverization Step

The obtained crystallized material was subjected to ball mill pulverization with $ZrO_2$ balls of φ 20 mm for 10 hours, and then subjected to ball mill pulverization in ethanol with a mixture of $ZrO_2$ balls of φ 5 mm, $ZrO_2$ balls of φ 3 mm, and $ZrO_2$ balls of φ 1 mm for 80 hours to provide crystallized material powder having a BET specific surface area of 14.7 $m^2/g$.

(d) Firing Step

With respect to 100 parts by mass of the crystallized material powder, 27.8 parts by mass (corresponding to 15 parts by mass in terms of carbon) of a nonionic surfactant polyethylene oxide nonyl phenyl ether (HLB value: 13.3, mass average molecular weight: 660) serving as a carbon source and 60 parts by mass of pure water were thoroughly mixed, and then the mixture was dried at 100° C. for about 1 hour. After that, the resultant was fired under a nitrogen atmosphere at 620° C. for 30 minutes to provide a positive electrode active material.

The obtained positive electrode active material was investigated for its powder X-ray diffraction pattern, and as a result, a diffraction line derived from an $Na_2FeP_2O_7$ crystal was found. The obtained positive electrode active material had a BET specific surface area of 14.3 $m^2/g$. In addition, the positive electrode active material had a surface covered with conductive carbon, and the content of the carbon was 1.8%.

Example 2

A positive electrode active material was produced in substantially the same manner as in Example 1 except that in the pulverization step, the ball mill pulverization in ethanol was performed for 70 hours to provide crystallized material powder having a BET specific surface area of 13.5 $m^2/g$. The obtained positive electrode active material was investigated for its powder X-ray diffraction pattern, and as a result, a diffraction line derived from an $Na_2FeP_2O_7$ crystal was found. The obtained positive electrode active material had a BET specific surface area of 13.1 $m^2/g$. In addition, the positive electrode active material had a surface covered with conductive carbon.

Example 3

A positive electrode active material was produced in substantially the same manner as in Example 1 except that in the pulverization step, the ball mill pulverization in ethanol was performed for 40 hours to provide crystallized material powder having a BET specific surface area of 7.5 $m^2/g$. The obtained positive electrode active material was investigated for its powder X-ray diffraction pattern, and as a result, a diffraction line derived from an $Na_2FeP_2O_7$ crystal was found. The obtained positive electrode active material had a BET specific surface area of 6.8 $m^2/g$. In addition, the positive electrode active material had a surface covered with conductive carbon.

Comparative Example 1

Sodium metaphosphate ($NaPO_3$) and ferric oxide ($Fe_2O_3$) were used as raw materials to prepare raw material powder having a composition comprising, in terms of mol %, 40% of $Na_2O$, 20% of $Fe_2O_3$, and 40% of $P_2O_3$. The raw material powder was melted at 1,200° C. for 45 minutes in the atmosphere. After that, the resultant was poured into a carbon jig, and subjected to ingot forming to provide an amorphous material.

The obtained amorphous material was subjected to ball mill pulverization with $ZrO_2$ balls of φ 20 mm for 10 hours, and then subjected to ball mill pulverization in ethanol with a mixture of $ZrO_2$ balls of φ 5 mm, $ZrO_2$ balls of φ 3 mm, and $ZrO_2$ balls of φ 1 mm for 80 hours to provide amorphous material powder having a BET specific surface area of 10.3 $m^2/g$.

With respect to 100 parts by mass of the amorphous material powder, 27.8 parts by mass (corresponding to 15 parts by mass in terms of carbon) of a nonionic surfactant polyethylene oxide nonyl phenyl ether (HLB value: 13.3, mass average molecular weight: 660) serving as a carbon source and 60 parts by mass of pure water were thoroughly mixed, and then the mixture was dried at 100° C. for about 1 hour. After that, the resultant was fired under a nitrogen atmosphere at 620° C. for 30 minutes to provide a positive electrode active material. The obtained positive electrode active material was investigated for its powder X-ray diffraction pattern, and as a result, a diffraction line derived from an $Na_2FeP_2O_7$ crystal was found. The obtained positive electrode active material had a BET specific surface area of 2.8 $m^2/g$. In addition, the positive electrode active material had a surface covered with conductive carbon.

Comparative Example 2

A positive electrode active material was produced in substantially the same manner as in Comparative Example 1 except that in the pulverization step, the ball mill pulverization in ethanol was performed for 40 hours to provide amorphous material powder having a BET specific surface area of 6.3 $m^2/g$. The obtained positive electrode active material was investigated for its powder X-ray diffraction pattern, and as a result, a diffraction line derived from an $Na_2FeP_2O_7$ crystal was found. The obtained positive electrode active material had a BET specific surface area of 2.6 $m^2/g$. In addition, the positive electrode active material had a surface covered with conductive carbon.

(Production of Sodium Ion Secondary Battery)

For each of the positive electrode active materials of Examples 1 to 3 and Comparative Examples 1 and 2, polyvinylidene fluoride serving as a binder and conductive carbon black serving as a conductive material were weighed out so as to have amass ratio "positive electrode active material:binder:conductive material=90:5:5." The positive electrode active material, the binder, and the conductive material were dispersed in N-methylpyrrolidone, and then thoroughly stirred with a rotation/revolution mixer to provide a slurry. Next, a doctor blade with an aperture of 75 µm was used to coat an aluminum foil having a thickness of 20 µm serving as a positive electrode current collector with the resultant slurry. The coated aluminum foil was dried at 70° C. with a dryer, and was then passed through and pressed between a pair of rotating rollers at 1 t/$cm^2$ to provide an electrode sheet. The electrode sheet was punched with an electrode punching machine so as to have a diameter of 11 mm, and was dried at 160° C. for 6 hours to provide a circular working electrode.

Next, the obtained working electrode was placed with its aluminum foil surface facing downward on a lower lid of a coin cell, and there were laminated, on the working electrode, a glass filter, which had been dried at 200° C. for 8 hours, a separator formed of a polypropylene porous film (Celgard #2400 manufactured by Hoechst Celanese Corporation) having a diameter of 16 mm, which had been dried under reduced pressure at 60° C. for 8 hours, and metal sodium serving as an opposite electrode, to thereby produce a test battery. As an electrolytic solution, a 1 M $NaPF_6$ solution/EC:DEC=1:1 (EC=ethylene carbonate, DEC=diethyl carbonate) was used. The assembly of the test battery was carried out in an environment having a dew-point temperature of −70° C. or less.

(Charge-Discharge Test)

A charge-discharge test was performed as described below. At 30° C., constant current (CC) charge (release of sodium ions from a positive electrode active material) was carried out from an open-circuit voltage (OCV) to 4.2 V, and the quantity of electricity charged in a unit mass of the positive electrode active material (charge capacity) was determined. Next, CC discharge (insertion of sodium ions in the positive electrode active material) was carried out from 4.2 V to 2 V, and the quantity of electricity discharged in the unit mass of the positive electrode active material (discharge capacity) was determined. After that, CC charge and discharge were repeated between 2 V and 4.2 V, and charge and discharge capacities were determined. The C-rate was changed from 0.1 C to 20 C, and the C-rate in charge and that in discharge immediately after the charge were set to be the same. The results are shown in Table 1 and 2. In Tables 1 and 2, the discharge capacity refers to the discharge capacity in the 1st cycle at a C-rate of 0.1, and the discharge capacity retention rate refers to the ratio of the discharge capacity at a C-rate of 10 to the discharge capacity at a C-rate of 0.1.

TABLE 1

|  | Example 1 | Example 2 | Example 3 |
|---|---|---|---|
| BET specific surface area of crystallized material powder (m²/g) | 14.7 | 13.5 | 7.5 |
| BET specific surface area of positive electrode active material (m²/g) | 14.3 | 13.1 | 6.8 |
| Discharge capacity (mAh/g) | 88 | 87 | 83 |
| Discharge capacity retention rate (%) | 82 | 71 | 54 |

TABLE 2

|  | Comparative Example 1 | Comparative Example 2 |
|---|---|---|
| BET specific surface area of amorphous material powder (m²/g) | 10.3 | 6.3 |
| BET specific surface area of positive electrode active material (m²/g) | 2.8 | 2.6 |
| Discharge capacity (mAh/g) | 82 | 57 |
| Discharge capacity retention rate (%) | 13 | 2 |

As shown in Table 1, the positive electrode active materials of Examples 1 to 3 each had a BET specific surface area of from 6.8 m²/g to 14.3 m²/g, a discharge capacity as high as 83 mAh/g or more, and a discharge capacity retention rate as high as 54% or more. Meanwhile, as shown in Table 2, the positive electrode active material of Comparative Example 1 had a BET specific surface area of 2.8 m²/g and a discharge capacity retention rate as low as 13%, though having a discharge capacity of 82 mAh/g, and the positive electrode active material of Comparative Example 2 had a BET specific surface area of 2.6 m²/g, a discharge capacity of 57 mAh/g, and a discharge capacity retention rate as low as 2%.

INDUSTRIAL APPLICABILITY

The positive electrode active material for a sodium ion secondary battery of the present invention is suitable as a positive electrode active material for a sodium ion secondary battery to be used for, for example, an electric car, an electric tool, and an emergency power source for backup.

The invention claimed is:

1. A method of producing a positive electrode active material for a sodium ion secondary battery comprising an inorganic powder that contains at least one transition metal element selected from the group consisting of Cr, Fe, Mn, Co, and Ni, Na, P, and O,
the method comprising:
 (a) an amorphous material formation step of melting a raw material that contains at least one transition metal element selected from the group consisting of Cr, Fe, Mn, Co, and Ni, Na, P, and O, to thereby obtain an amorphous material;
 (b) a crystalline material formation step of subjecting the amorphous material to heat treatment to obtain a crystalline material;
 (c) a pulverization step of pulverizing the crystalline material to obtain crystalline material powder; and
 (d) a firing step of subjecting the crystalline material powder to heat treatment to precipitate a crystal of the formula $Na_xM_yP_2O_7$, wherein M is at least one transition metal element selected from the group consisting of Cr, Fe, Mn, Co, and Ni, x falls within a range of $1.20 \leq x \leq 2.10$, and y falls within a range of $0.95 \leq y \leq 1.60$.

2. The method of producing a positive electrode active material for a sodium ion secondary battery according to claim 1, wherein the crystalline material powder has a BET specific surface area of from 3 m²/g to 50 m²/g.

3. The method of producing a positive electrode active material for a sodium ion secondary battery according to claim 1, wherein the positive electrode active material contains, in terms of mol %:
 25% to 55% of $Na_2O$,
 a total of 10% to 30% of at least one selected from the group consisting of $Cr_2O_3$, $Fe_2O_3$, $MnO_2$, $CoO$, and $NiO$, and
 25% to 55% of $P_2O_5$.

* * * * *